(12) United States Patent  
Dandurand

(10) Patent No.: US 9,026,936 B2
(45) Date of Patent: May 5, 2015

(54) SYSTEM AND METHOD OF FACILITATING PROJECT MANAGEMENT WITH USER INTERFACE

(75) Inventor: Paul G. Dandurand, Burlington, VT (US)

(73) Assignee: PieMatrix, Inc., Burlington, VT (US)

( * ) Notice: Subject to any disclaimer, the term of this patent is extended or adjusted under 35 U.S.C. 154(b) by 1684 days.

(21) Appl. No.: 12/258,637

(22) Filed: Oct. 27, 2008

(65) Prior Publication Data

US 2009/0125831 A1 May 14, 2009

Related U.S. Application Data

(60) Provisional application No. 61/002,902, filed on Nov. 13, 2007.

(51) Int. Cl.

| | |
|---|---|
| *G06F 3/00* | (2006.01) |
| *G06F 9/00* | (2006.01) |
| *G06F 17/00* | (2006.01) |
| *G06F 3/0483* | (2013.01) |
| *G06F 3/0481* | (2013.01) |
| *G06F 3/0482* | (2013.01) |
| *G06F 17/30* | (2006.01) |
| *G06Q 10/06* | (2012.01) |

(52) U.S. Cl.
CPC ............ *G06F 3/0483* (2013.01); *G06F 3/0481* (2013.01); *G06F 3/0482* (2013.01); *G06F 17/30572* (2013.01); *G06Q 10/06* (2013.01)

(58) Field of Classification Search
USPC .......................................... 715/788, 780, 764
See application file for complete search history.

(56) References Cited

U.S. PATENT DOCUMENTS

| | | | |
|---|---|---|---|
| 6,750,864 B1 * | 6/2004 | Anwar ........................... | 345/440 |
| 7,594,191 B2 * | 9/2009 | Leidig et al. ................... | 715/825 |
| 8,015,056 B1 * | 9/2011 | Fenstermaker et al. ..... | 705/7.39 |
| 2008/0307369 A1 * | 12/2008 | Liu et al. ....................... | 715/855 |

* cited by examiner

*Primary Examiner* — Boris Pesin
*Assistant Examiner* — Sabrina Greene
(74) *Attorney, Agent, or Firm* — Fenwick & West LLP

(57) ABSTRACT

A project management system and method includes a user interface with "pie slices" and "layers" to provide a matrix view that integrates multiple best practices content. The slices of the pie represent project stages and the matrix view represents layers of best practice content, such as project management, quality assurance, Sarbanes-Oxley compliance, and other processes. Each cell of the matrix represents best practice information in process, people, and deliverables views. The user loads a project and uses the best practice steps to help with their project implementation. The user interface allows the users to select a best practice layer, then select a project stage cell, and then drill down to view process step details, view people roles information, or work with files that define the project deliverables.

16 Claims, 17 Drawing Sheets

User Interface 100

SYSTEM AND METHOD OF FACILITATING PROJECT MANAGEMENT WITH USER INTERFACE

RELATED APPLICATION

This application claims the priority of U.S. Provisional Application No. 61/002,902, filed Nov. 13, 2007.

BACKGROUND

1. Field of Art

The present invention generally relates to project management, and more specifically, to facilitating project management by providing a user with visual display of project parameters.

2. Description of the Related Art

Companies are challenged with leveraging different process methodologies for their project planning, development, and implementation efforts. Example processes include project management, quality assurance, change management, team communications, Sarbanes Oxley, etc. These processes are silos, meaning that their focus is for one process area and they do not take into account other process areas. (The terms "process", "best practice", and "process methodology" are used interchangeably and all represent the same concept). The problem is the difficulty to manage these different processes in an integrated fashion, as enterprise solutions require more business and technology integration (sharing, manipulating, and storing the same data). Project managers are now faced with controlling these different and complex process needs manually and many do not have the needed knowledge or experience.

Some organizations that have pre-defined best practices for managing projects or for managing regulations and compliance needs use simple technologies such as stored text documents placed on file servers. The organization's project teams may know where to find the documents, but many people do not spend enough time learning and reviewing the processes to ensure compliance, especially since the documents are not designed for day-by-day processing. Also, they do not have a way to easily link those stored documents directly with project template files and project deliverable files used for implementing projects.

Current advances in computer software programs are making inroads to providing technology solutions that better manage project best practices. Most of these technologies are driven by functions rather than process. Their user interfaces are designed with functional tasks that are grouped in a hierarchal folder or directory structure. The user behavior is restricted to selecting and drilling down to deeper levels before being able to locate their process step. In addition, this user interface does not make it easy to associate project stages (i.e., plan, build, test) as shared categories without requiring the user to either create the same set of project stages for each directory containing best practices. Another difficulty comes when the user wants to compare one set of best practice steps with another set of best practice steps while reviewing the same project stage. The hierarchal structure fails when each process step is to display information on process details, people roles and responsibilities, and project deliverable files.

An example of an existing hierarchal structure in the marketplace is as follows. If the best practice was called "project management", a directory would be called "Project Management". Within this directory, there would be subdirectories called "Plan", "Design", "Build", "Test", and "Deploy". In each of these subdirectories there would be more subdirectories called "Process Details", "People", and "Deliverables Files". Now if there were a second best practice for "quality assurance", it too would contain all of the subdirectories with more subdirectories. The user experience would be complex, especially if the user wants to relate one step within "Project Management" with a step within "Quality Assurance". The depth of these directories restricts user adoption and productivity. This is why many technologies focus on one best practice set or restrict their programs to be more of a task management system that does better with a list of task items than a platform for containing best practice processes.

Another type of technology is process engine software used mainly for defining business process steps. These are sophisticated programs that allow users to design a process from scratch and then define software program business rules to execute when the process events are implemented. The common outcome of these tools is meant for driving custom process steps that are not related to repeatable projects. The user interfaces for these process engine tools are combinations of hierarchal and graphical views. The hierarchy contains directories for process areas, which contain subdirectories and more subdirectories. Once a process area within a directory is located, the viewer then sees the process in a visual graph representation. One problem with this user interface is similar to the task technology above where the hierarchal views make is difficult to relate different process sets with each other. Another problem with this user interface model is the graph objects do not easily relate to other factors like detail process information, people roles and responsibilities, and file deliverables. The reason is that most of these types of user interfaces are more for executing program business rules than for displaying associated data. Furthermore, these user interfaces fail to present high level, mid-level, and detailed level information on the same page. Users get lost in complicated user interfaces that require a lot of hunting to find what they need and contemplating to figure out where they are.

Organizations need to learn how-to-use information from their third-party vendor tools that they have invested in for their projects. For example, many organizations use multiple technologies to implement projects, such as software for project planning, requirements definition, special calculations, and resource management. Currently, the how-to-use data is usually contained in that tool's help file, user manual, or other form of documents. These how-to-use manuals are functional based and are not related to a best practice such as project management, quality assurance, or change management. That makes it difficult for the organization to learn how to best use their tools in relationship to these processes. The user interfaces for the above mentioned task management technologies and process management engines are not designed for dealing with other third-party tools. Their user interfaces are not well suited to provide any visibility to on how to use other third-party technology tools with associated best practice content. Some may have text fields to contain any extra information, but this is cumbersome since the user may not find any consistency on how data is presented from one process step to another.

It is desirable to provide a user interface that overcomes the limitations of existing technology user interfaces as mentioned above. A desirable user interface is one that provides a matrix view of process best practices with project slices (stages) on the x-axis and the best practice layers on the y-axis. This desirable user interface has a third dimensional view for process, people, and deliverable content as they relate to each of the cells in the slices (x-axis) and layers (y-axis). In addition, the top view of the slices is presented with a circular "pie" metaphor to show that projects are iterative as they evolve over time. For example, once you get to one end, you circle back and start over again at the beginning. These preferable views have a better means for presenting multiple best practices content at the same time.

SUMMARY

As disclosed herein, a project management system and method uses both a pie view and a matrix view to facilitate user understanding and implementation of project implementation steps.

In one embodiment, a user interface provides an access to a platform that is used for creating, organization, and managing organizations' process methodologies and best practices for projects. This access is provided via a web browser either online over the Internet or within an organization's private network. The interface is based on a "pie slice" and "layer" view that integrates in a matrix multiple best practices content and displays a third dimension of data regarding process details, people roles, and deliverable files along with other tool information. The user clicks on a project button that loads the user interface view for a particular project. The first view is a pie diagram displaying the project stages. This diagram of the pie is viewed in multiple angles, one of which is a slight angle to give a three dimensional view of a circle. In another embodiment, it is viewed on the edge to give a two dimensional view. The user selects a best practice layer from a drop down list, which then loads content data into the pie diagram. Navigation at this point brings forth the matrix side of the user interface where the user selects a pie cell from that layer, which then displays the process boxes that relate to that slice (x-axis of the matrix) with the layer (y-axis of that matrix). The interface now displays a process box in the process dimension. The user then selects a different dimension tab to show either the people roles or the deliverable files and tools view. The interface swaps the data depending on which tab is selected. As the user loads more than one layer at a time, the interface displays multiple best practice content simultaneously. Again, each of these layers in the matrix displays information on process, people, or deliverables with the third-dimension views. Layer integration is also accomplished with the user interface. A process step has a link that will automatically load a related process box from the same or a completely different layer and slice. The interface displays the additional information within the same window area. The user interface supports best practice data view for third-party software programs from within the deliverables dimension for any layer, slice, and process box. In all views, the interface is designed to display the full pie and matrix view on one screen eliminating the need for the user to drill down in traditional hierarchal fashion and leverage a birds-eye or high-level, mid-level, and detail view.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description, when taken in conjunction with the accompanying drawings, in which.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of the claimed invention.

Figure 1:
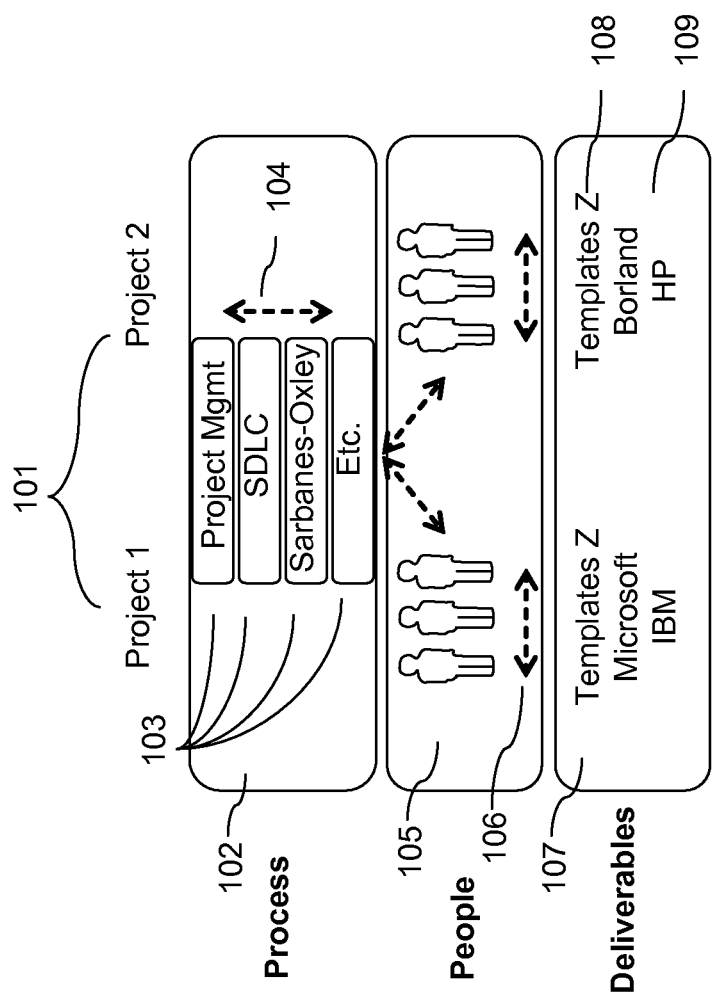
FIG. 1 is an illustration of the overall functional model of what the user interface supports for the application.
Figure 4:
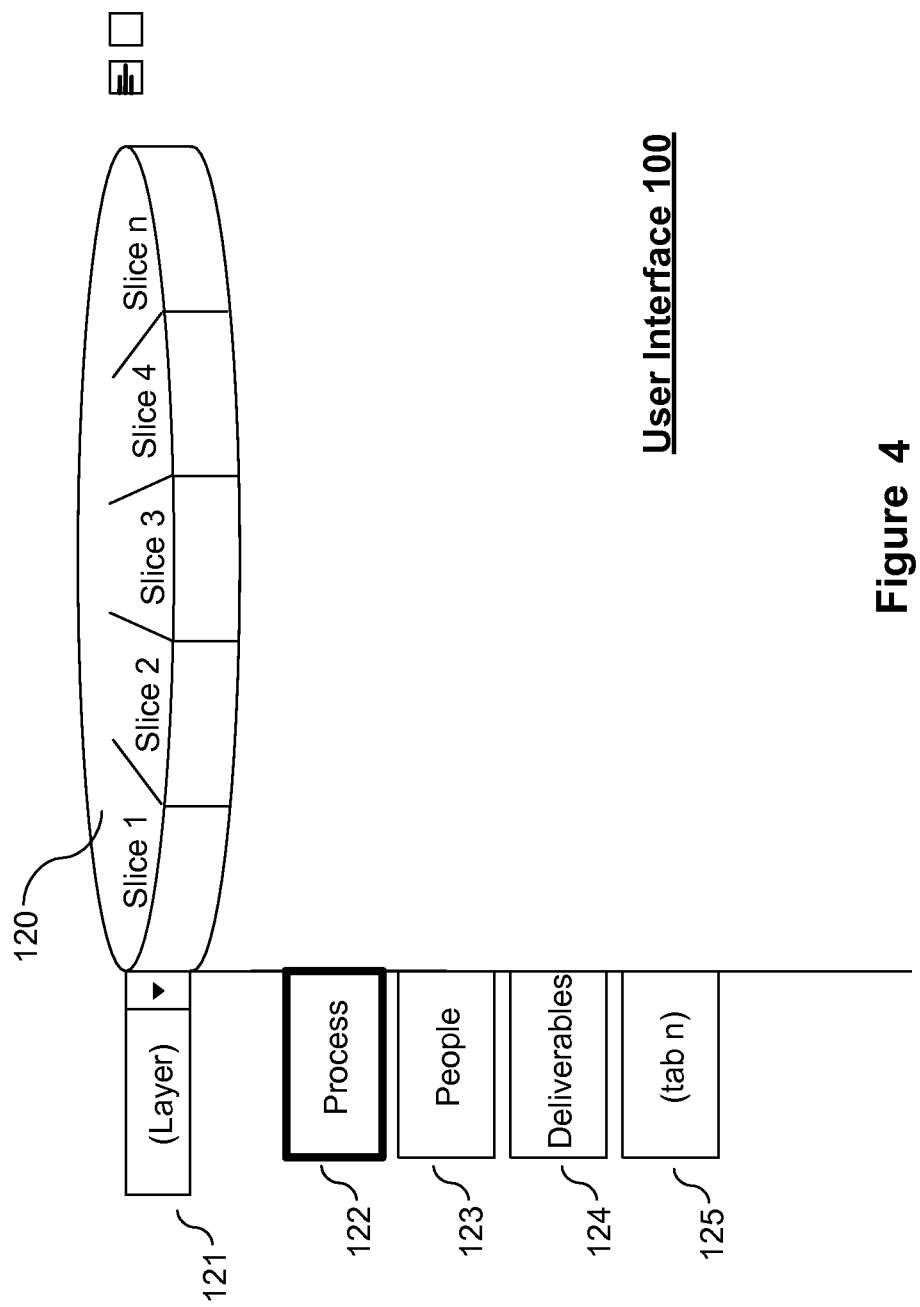
FIG. 4 is an illustration of the first view of the pie and matrix when loaded from a project.

A user interface is modeled for an enterprise level solution for organizations of all types that have ongoing projects. It provides a view to a central repository of best practice or process methodology content. Referring to FIGS. 1 and 4, there is shown an embodiment of the business model features (FIG. 1) that the user interface (FIG. 4.) covers. FIG. 1 is not a user interface, such as presented in FIG. 4 (User Interface 100), but illustrates an overall process model to which an interface such as illustrated in FIG. 4 is applicable, and which can be used to explain the user interface in context. FIG. 1 shows an example of an organization with two projects 101, "Project 1" and "Project 2". An organization has dozens or even hundreds of simultaneous projects, but for the sake of this description, the diagram shows two projects. "Process" 102 is the first of three factors illustrated in this figure. Process 102 includes a set of best practices 103 defined as central to the organization, such as "Project Mgmt", "SDLC", etc. A user interface (e.g., FIG. 4 User Interface 100) presents to the users a view into any set of best practices. The user interface allows the organization to integrate 104 different best-practice content items so that they point to each other. In a preferred embodiment, the user interface relates best practice process steps 103 to people roles 105. The centralized process steps are available via the user interface to anyone who has access to the application over the web or over a network and can easily share information with each other 106. The third factor is "Deliverables" 107, which is illustrated with standard templates 106 that are placed in the system file server and accessed by any project team through the user interface. In a preferred embodiment, a user interface feature allows best practice content to be assigned to third-party vendor products 109. This data is presented in the user interface to help users learn how to best use these third-party tools.

Figure 2:
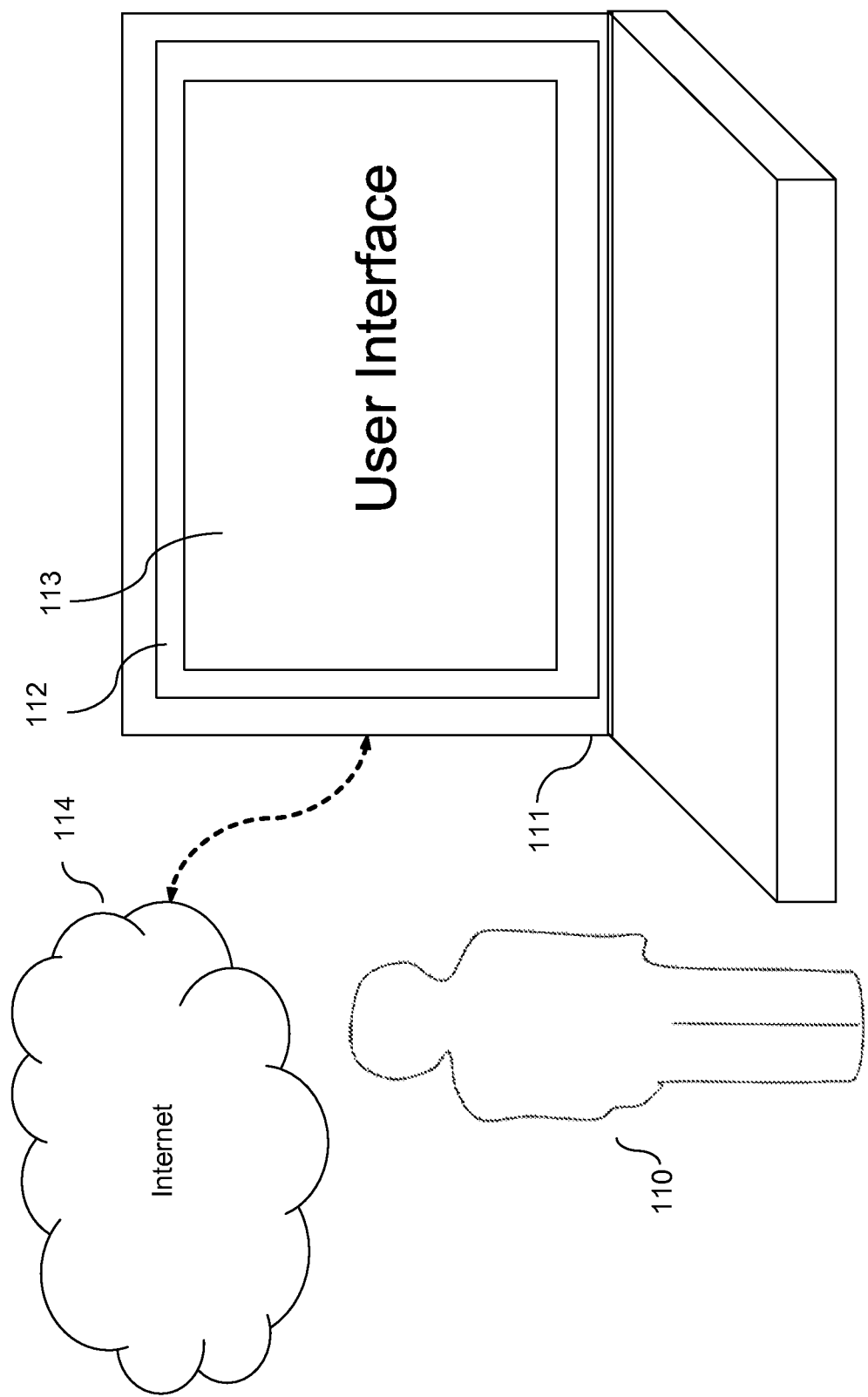
FIG. 2 is a diagram displaying the user interface within its technology container of the conventional computer and web browser.

FIG. 2 represents the medium that is used for the user interface 113 (FIG. 4 User Interface 100). An organization user 110 uses a conventional computer 111 and a conventional web browser 112 (such as Microsoft Internet Explorer™ or Firefox™) to access the user interface 113 (FIG. 4 User Interface 100) while connected to the Internet 114 or to the organization's internal network.

Figure 3:
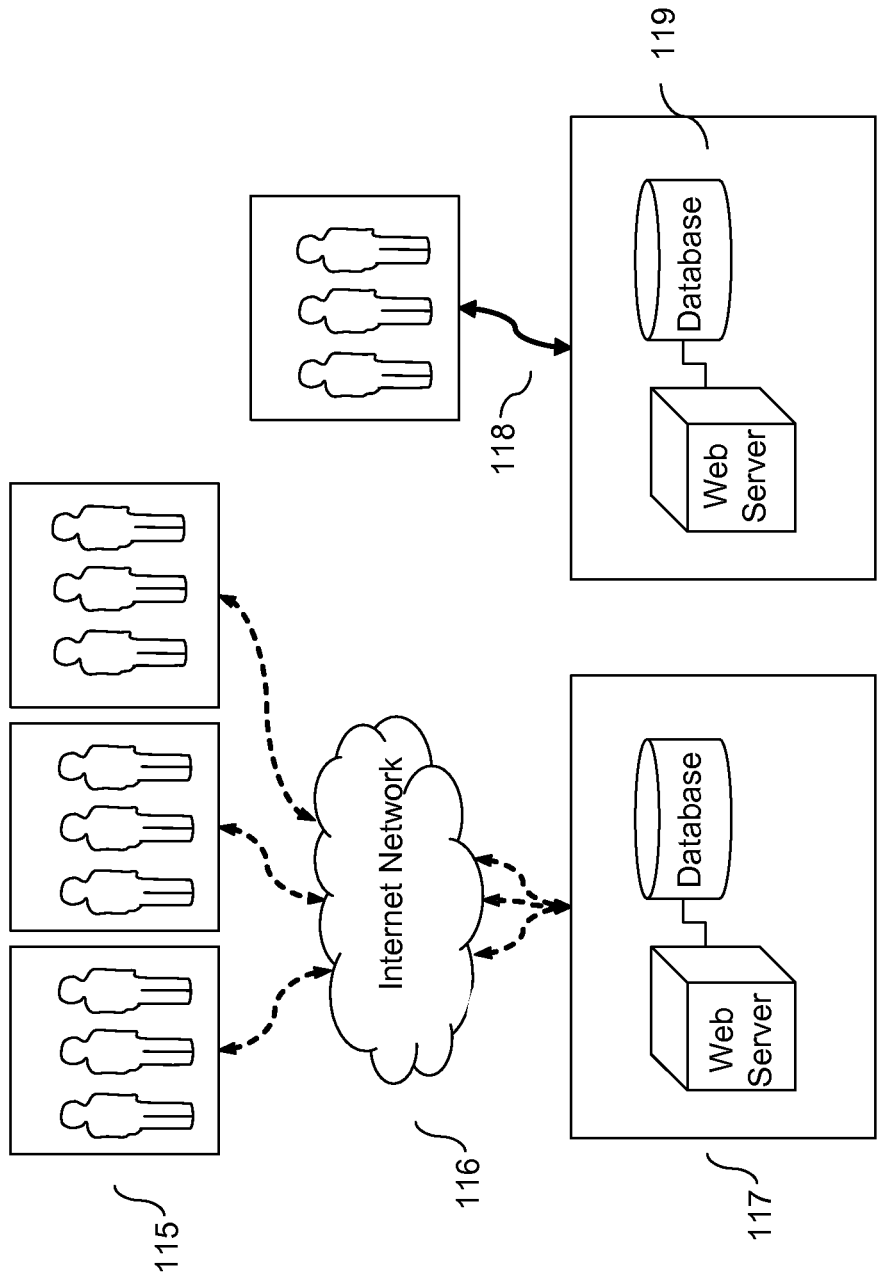
FIG. 3 is a diagram displaying how the user interface connects with the overall architecture.

FIG. 3 illustrates the overall architecture that is used for the user interface (FIG. 4 User Interface 100). Organization users 115 access the user interface (FIG. 4 User Interface 100) from their computer and within their web browser (as reviewed in FIG. 2) that is connected via the Internet 116. Through the Internet, the user interface's data makes a connection to web servers and a database 117. In another embodiment, the user interface is used within an organization's firewall on their own network 118 with a stand-alone architecture system that has a web server and database 119. In one embodiment, software stored in the storage media (e.g., hard disk or other memory) of, and operating on the processor of, a computer, e.g., 111, implements systems for provision of the user interfaces discussed herein. More specifically, in one embodiment such software implements a first subsystem providing a pie user interface portion and a second subsystem implementing a matrix user interface portion.

The user interface (User Interface 100) pie/layer/matrix display is illustrated with a shell view in FIG. 4. This view is a project without any best practice content loaded. This framework represents a three-dimensional pie diagram of project lifecycle stages (called slices) 120. This three-dimensional pie diagram can be angled to different positions. This example diagram shows one angle of the pie as seen from a side view. To the left of the pie diagram is a drop down value list field 121 for selecting a best practice (or process methodology) layer. On the left side are tabs to present data under the pie section on the right open space. These tabs present a set of views for layer and slice content (not displayed in this figure, see FIG. 8 for layer and slice content). The first tab called "Process" 122 is selected on by default. While this tab is selected, the layer and pie slice data is specific to process information (see FIG. 8). The second tab 123 is for "People" data, which displays people role, responsibility, and other people related data for layer and slice content. The next tab 124 is for "Deliverables" data, which also focuses on deliverables-related information for layer and slice content. In another embodiment, extra tabs 125 are added for more views on data such as project scheduling and milestone data.

Figure 5:
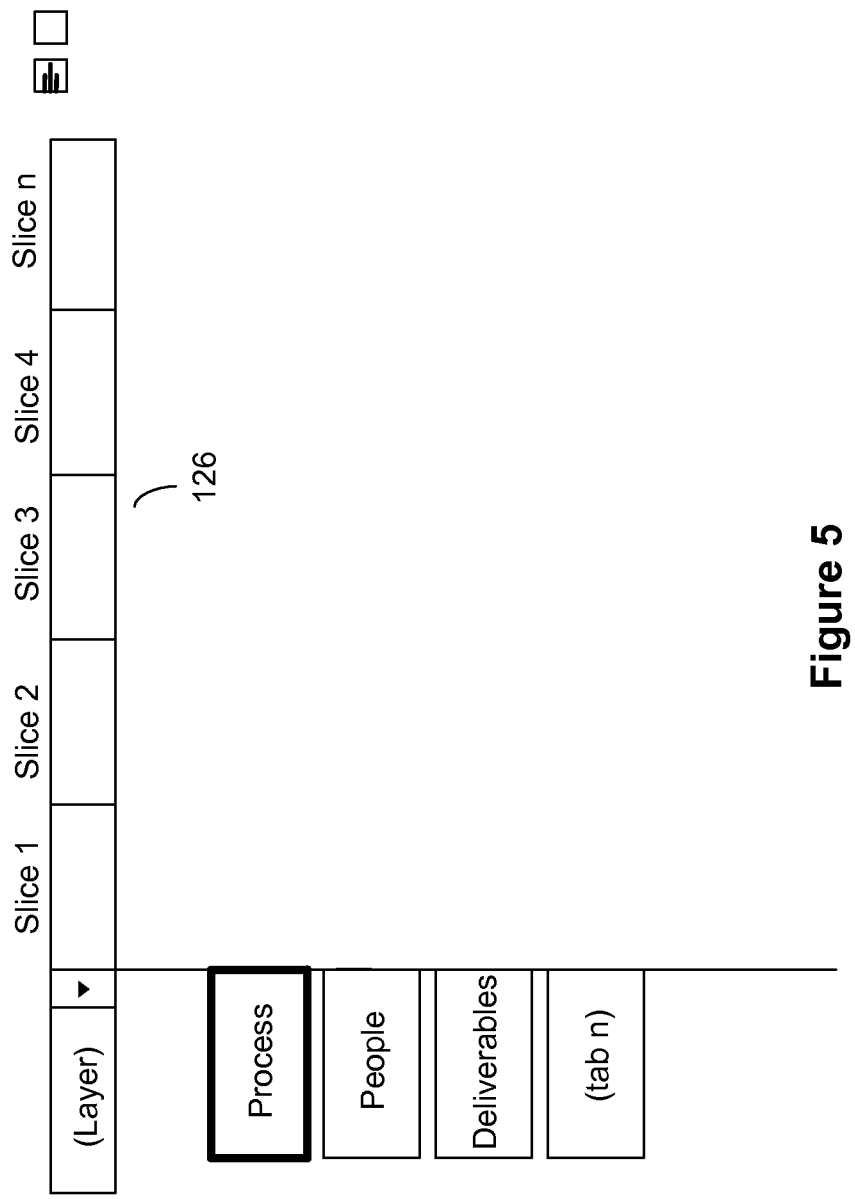
FIG. 5 is an illustration is the same view as FIG. 3 except it displays an interface view of the pie from a direct side angle showing it in two dimensions instead of three.

In FIG. 5, the user interface pie view is displayed in another embodiment. Here the slices of the pie are represented in a two-dimensional or direct side view 126. This view displays the project slices as if the user was looking at the pie from a flat side angle.

Figure 6:
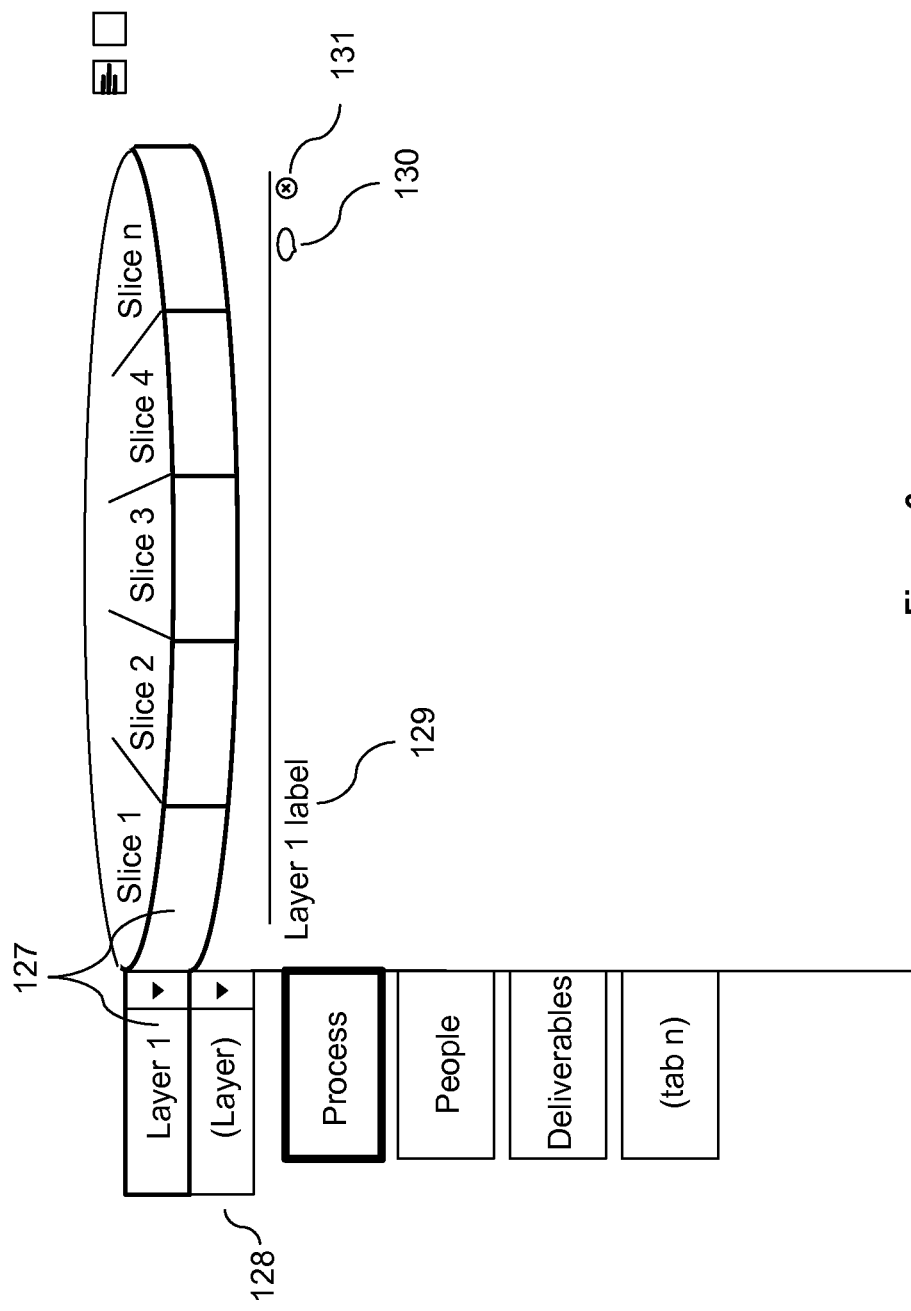
FIG. 6 is an illustration displaying a loaded layer in the pie and matrix view.

The user interface makes best practice content ready for selection when loaded from the left side of the pie dropdown list field as shown in FIG. 6. When the layer is selected from the dropdown list field, the field turns to a new color along with all cells in the pie layer view that has content 127. This action automatically adds a new dropdown list field ready for a second selection 128. The user interface allows the user to select a second layer to load or reselects another layer from the first layer loaded by choosing another option in the dropdown list field. When a layer is loaded, a layer label 129 is displayed as an indicator. To the right of this label is a button 130 to pop up an objective description for the selected layer. The content in this popup is dependent and specific to each layer. The user closes the layer with an "x" close button 131 or deselects the layer form the dropdown list field.

Figure 7:
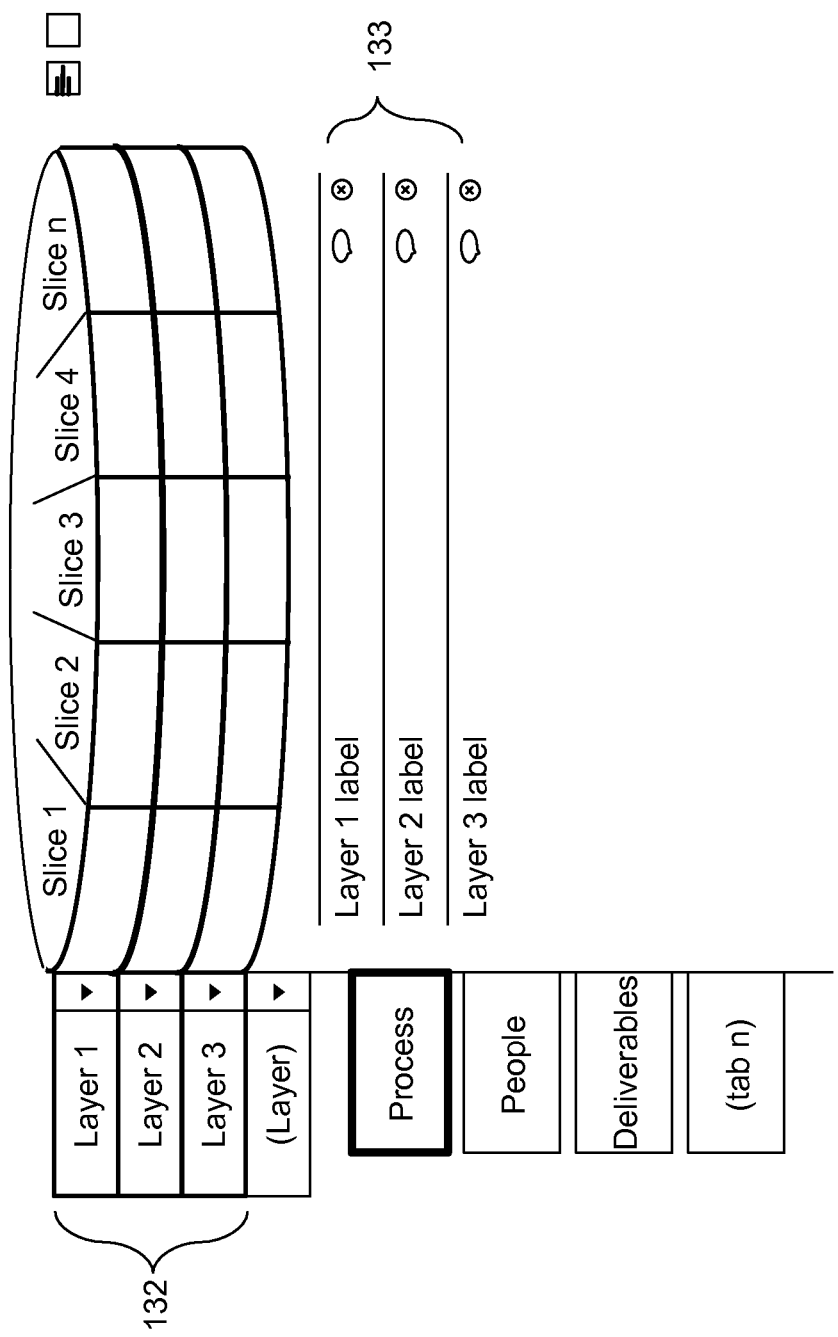
FIG. 7 is an illustration displaying loaded multiple layers expanding the pie and matrix view.

The pie/layer/matrix structure in the user interface presents multiple layers to be loaded at the same time. The FIG. 7 illustration displays three layers loaded 132. Each layer has best practice content. When there are no slice cells selected, the interface displays a layer label for each layer loaded 133. If at least one cell is selected, then the labels of the non-selected layers disappear for a clean display (as shown in FIG. 8).

Figure 8:
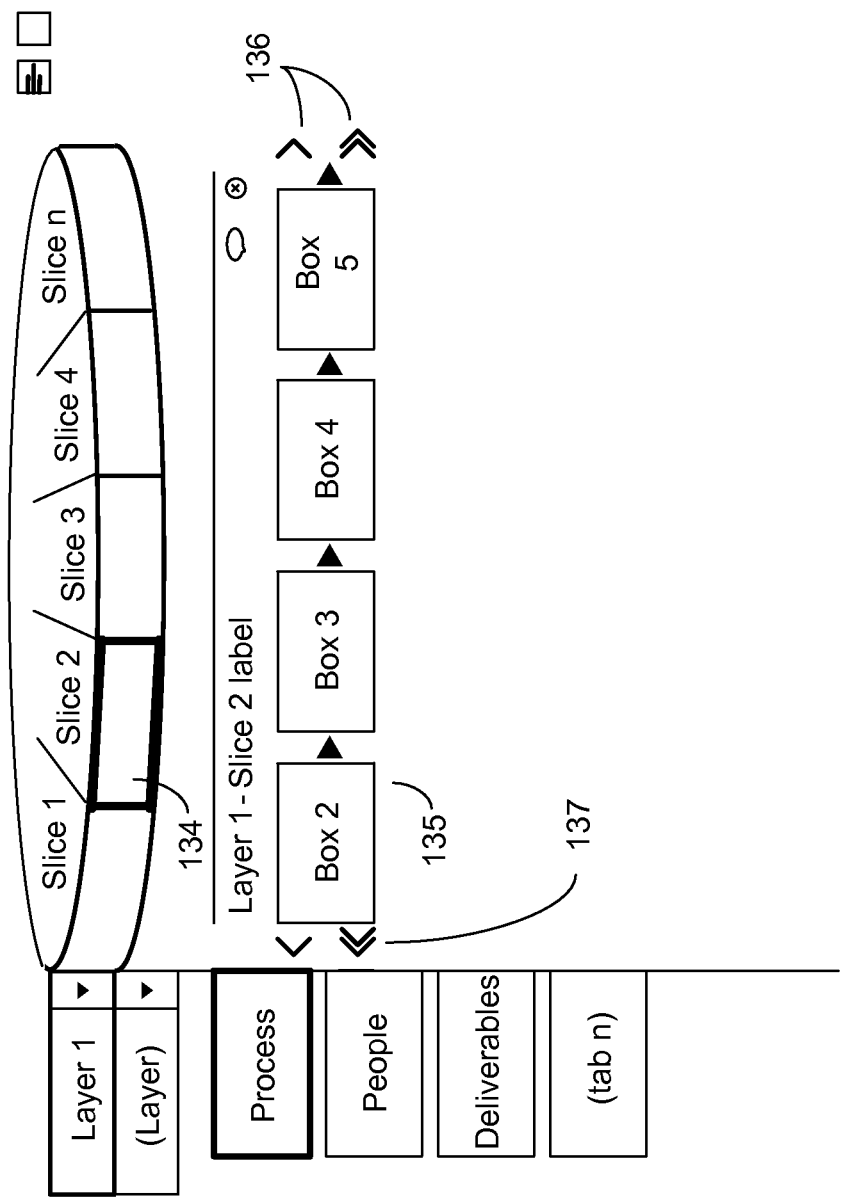
FIG. 8 is an illustration showing a selected cell in the layer and slice, which then displays a set of process boxes that are related to that cell.

Referring now to FIG. 8, there is a loaded layer with a selected slice cell 134. This represents the ability for the user to easily choose a cell to display that cell's process boxes 135. The process boxes are setup as either one or many boxes in a row. If there are more boxes than the browser window can display, the user interface provides a forward and fast forward slider feature 136 as well as corresponding reverse features 137. These forward, fast forward, reverse, and fast reverse buttons will not display if there are no extra boxes out of view. In this figure, a first box "Box 1" is to the left of "Box 2" and is out of view unless the user clicks on reverse 137, which would slide the box set to the right to make the first box visible. Likewise, there are more boxes beyond "Box 5", so the forward button 136 would bring "Box 6" or others into view, sliding the box set to the left.

Figure 9:
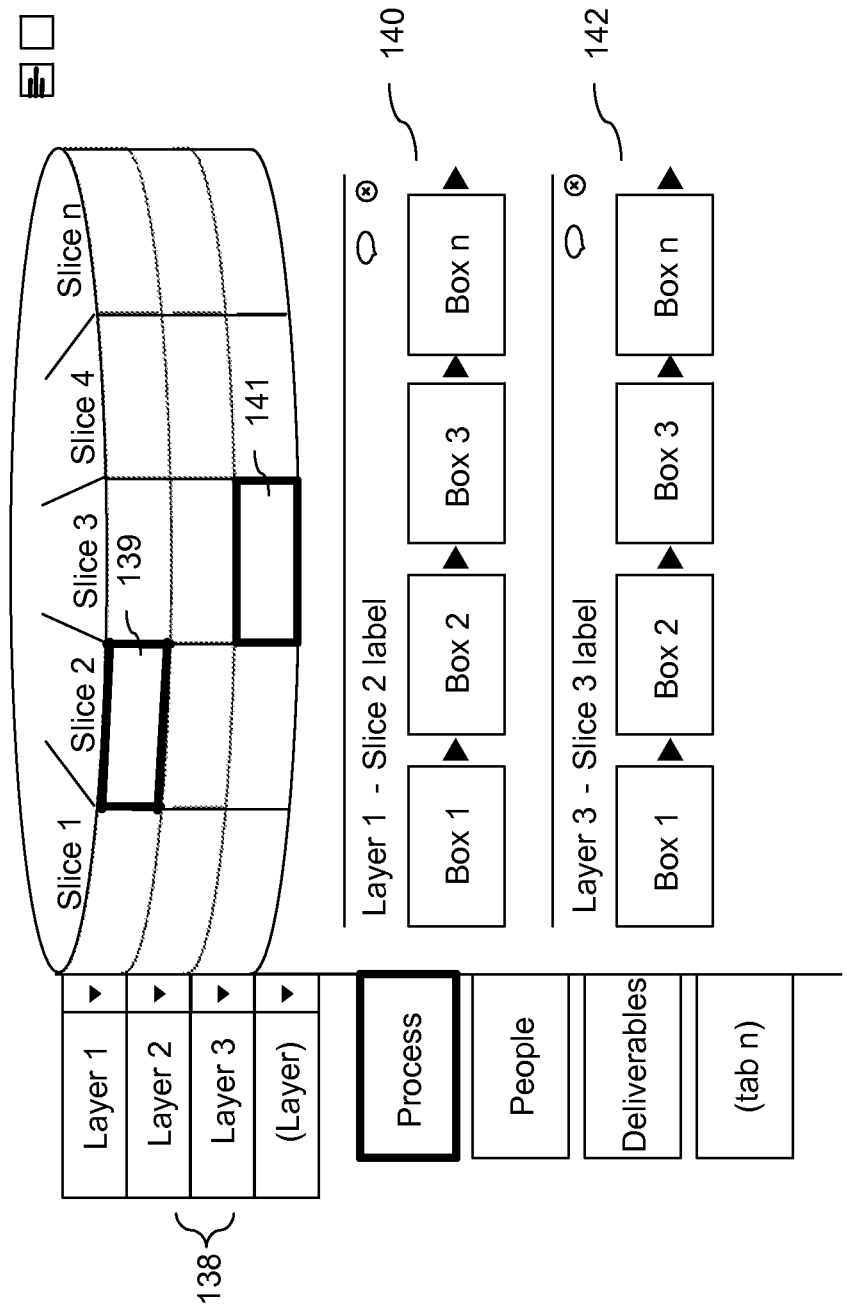
FIG. 9 is an illustration of multiple layers and multiple cells selected to display more than one set of related process boxes.

The user interface displays multiple layers and multiple process box rows as shown in FIG. 9 when more layers are loaded 138. The user selects one or multiple cells at a time to view one or multiple sets of process boxes. In this diagram, the intersection cell of "Layer 1" and "Slice 2" is displayed 139 as selected. This action displays the set of process boxes associated with this combination as shown in the first row 140 under the pie image. Likewise, the intersection cell 141 of "Layer 3" and "Slice 3" combination displays a second row of process boxes 142. This pie/layer/matrix user interface is flexible to allow any combination of layers, slices, and process boxes to be displayed inside a web browser window.

Figure 10:
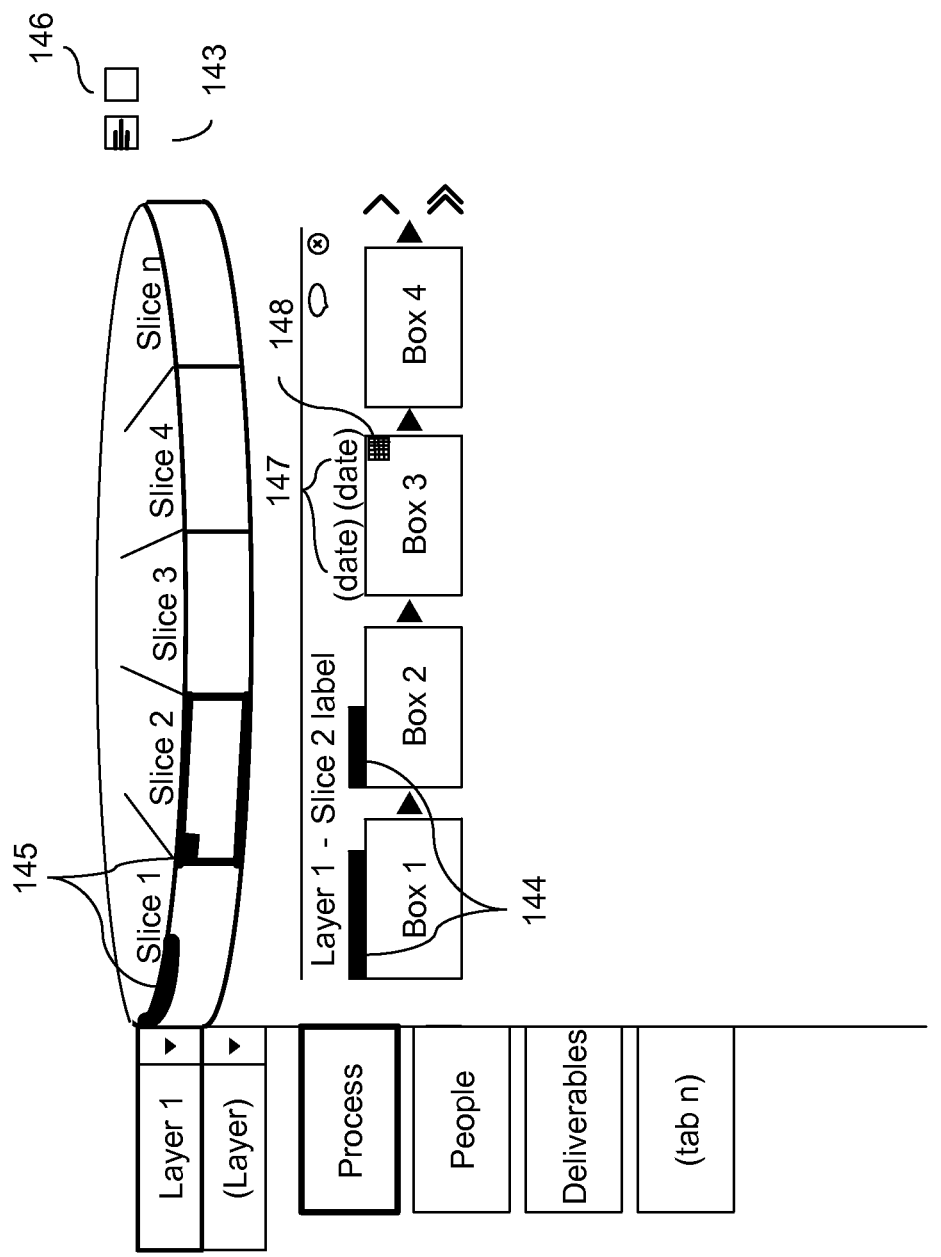
FIG. 10 is an illustration displaying how the user interface presents progress reports, start and end dates, and access to project social networking features.

The user interface provides reporting features, which are represented in FIG. 10. The interface has a progress report button 143 that displays progress bars 144 above the process boxes and progress bars 145 above the cells in the pie layers. The bars are color coded to present progress such as "In Progress", "Completed", "Issue", "Caution", "Not Completed", etc. As process steps are executed, the progress bars change automatically. The user interface also presents start and end dates 147 for process box scheduling when the user selects a calendar button 146. This also turns on a calendar feature button 148 in the upper right corner of each process box. When these buttons are clicked, a calendar menu pops up for the user to select a date. Once selected, that date will then display above the box 147.

Figure 11:
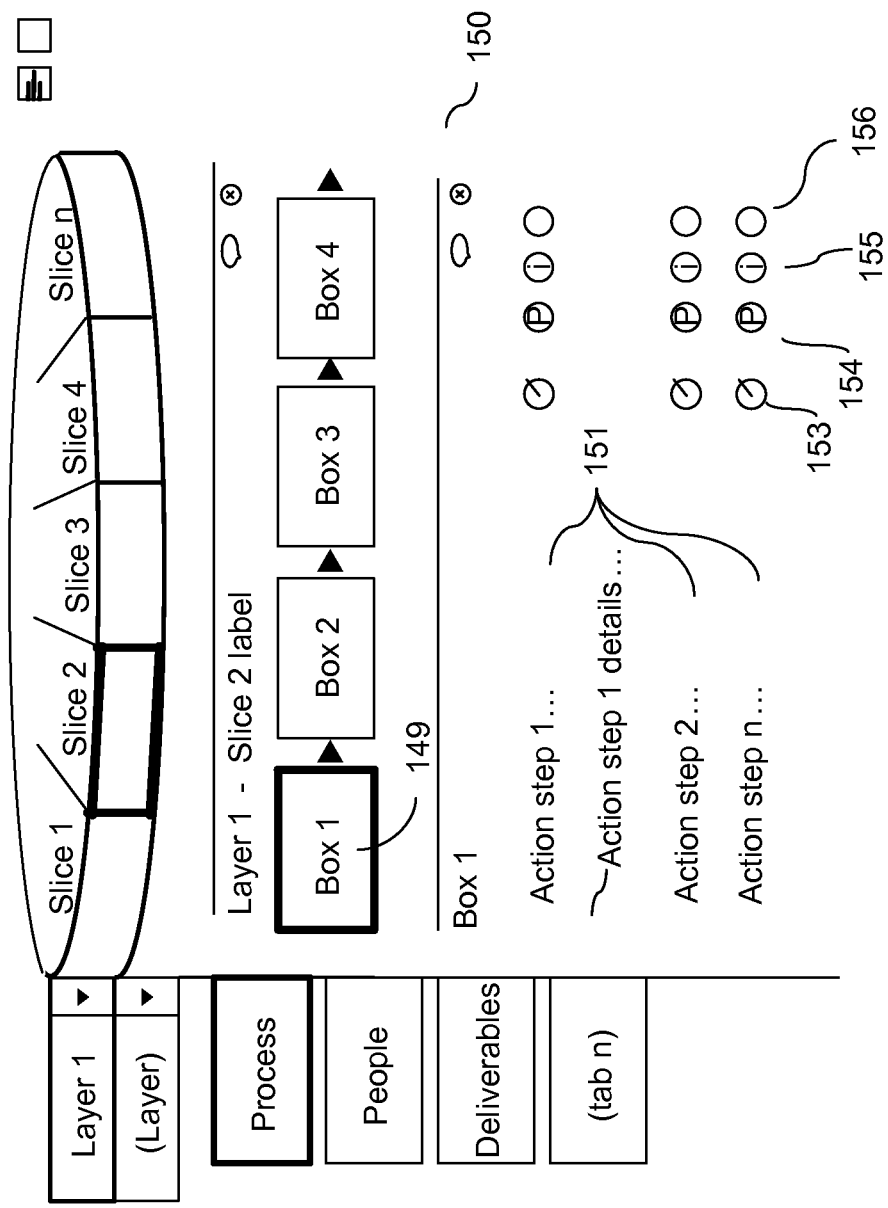
FIG. 11 is an illustration showing a selected process box with the process tab selected, showing process actions steps.

The user selects any process box that is visible with a click. FIG. 11 expands the matrix view with the selection of a process box 149. In doing so, a process box indicator line 150 displays under the box set and this indicator includes the box label and other buttons like the objective and close buttons (FIG. 6 130 and 131). Below this title line are the process box's actions steps 151. The user clicks on an action step for it to expand to display more detailed information 152 about that step. If the user selects a different process box, then a different set of actions steps is displayed. This user interface feature is able to display on one screen, the high-level pie/layer view with the selected slice, the mid-level process boxes, and now the detailed process action steps. This is an efficient use of an interface to give the user a sense of context so they always know where they are in the application.

Figure 12:
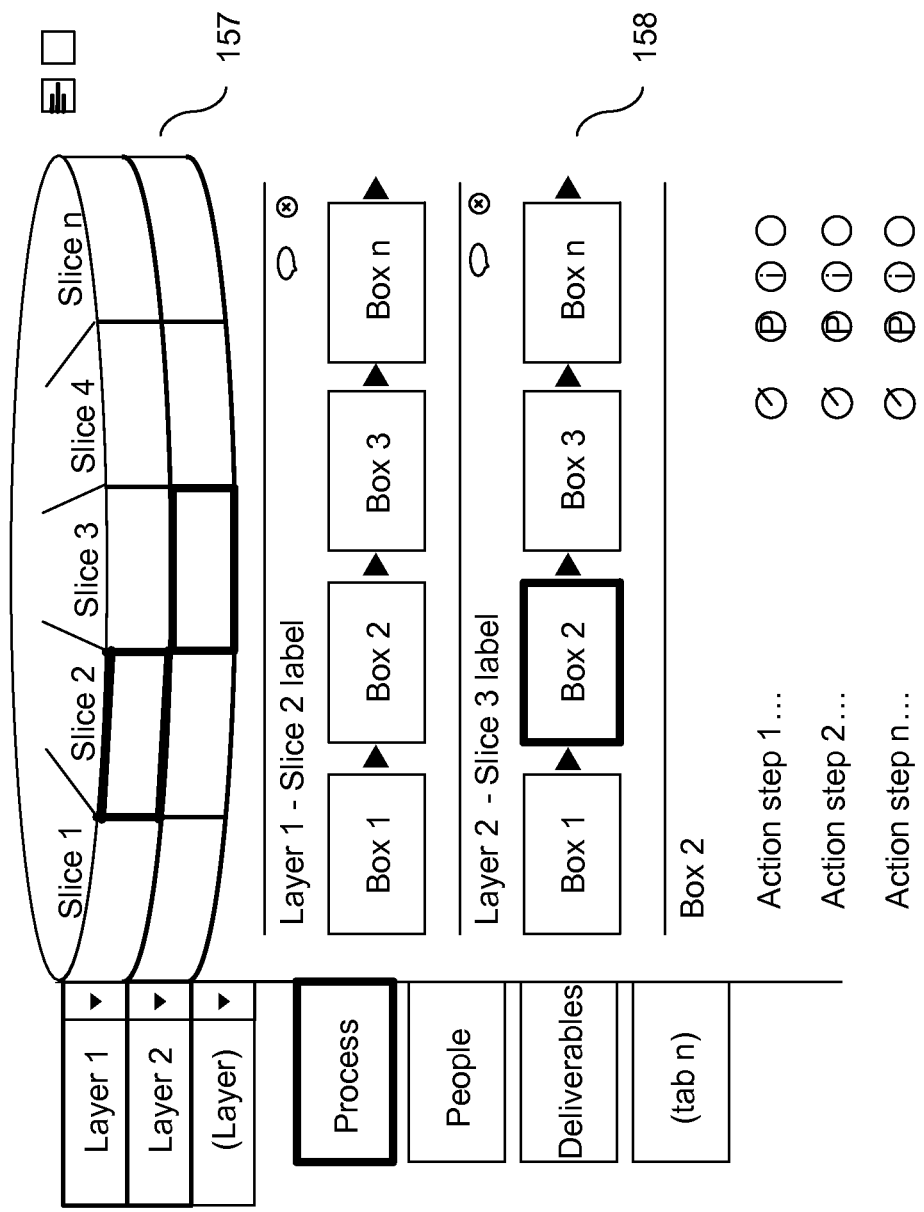
FIG. 12 is an illustration showing two layers and two slices selected along with one process box selected.

To the right of the action steps are additional buttons. The notes button 153 allows the user to add private or public (visible by all team members) notes. The "P" button 154 displays a popup status menu to allow the user to select the step's status such as "In Progress", "Completed", "Issue", "Caution", "Not Completed", etc. Selected statuses are stored in the database to allow progress reports to display (as shown previously in FIG. 10). The "I" button 155 to the right of "P" is for integration links between the current step and one or more other process boxes. Clicking on the "I" button will pop up a list of links and when the user clicks a link, the user interface loads a layer, slice, and box set that corresponds to that link. This is displayed in FIG. 12 where a second layer 157 was automatically loaded with its set of process boxes 158. This adds a dependency capability to each step and provides a way to integrate multiple best practices together. Referring again to FIG. 12, the last button 156 to the right of "I" button 155, is shown as shaded. This is an "E" button that executes events for automating tasks.

Figure 13:
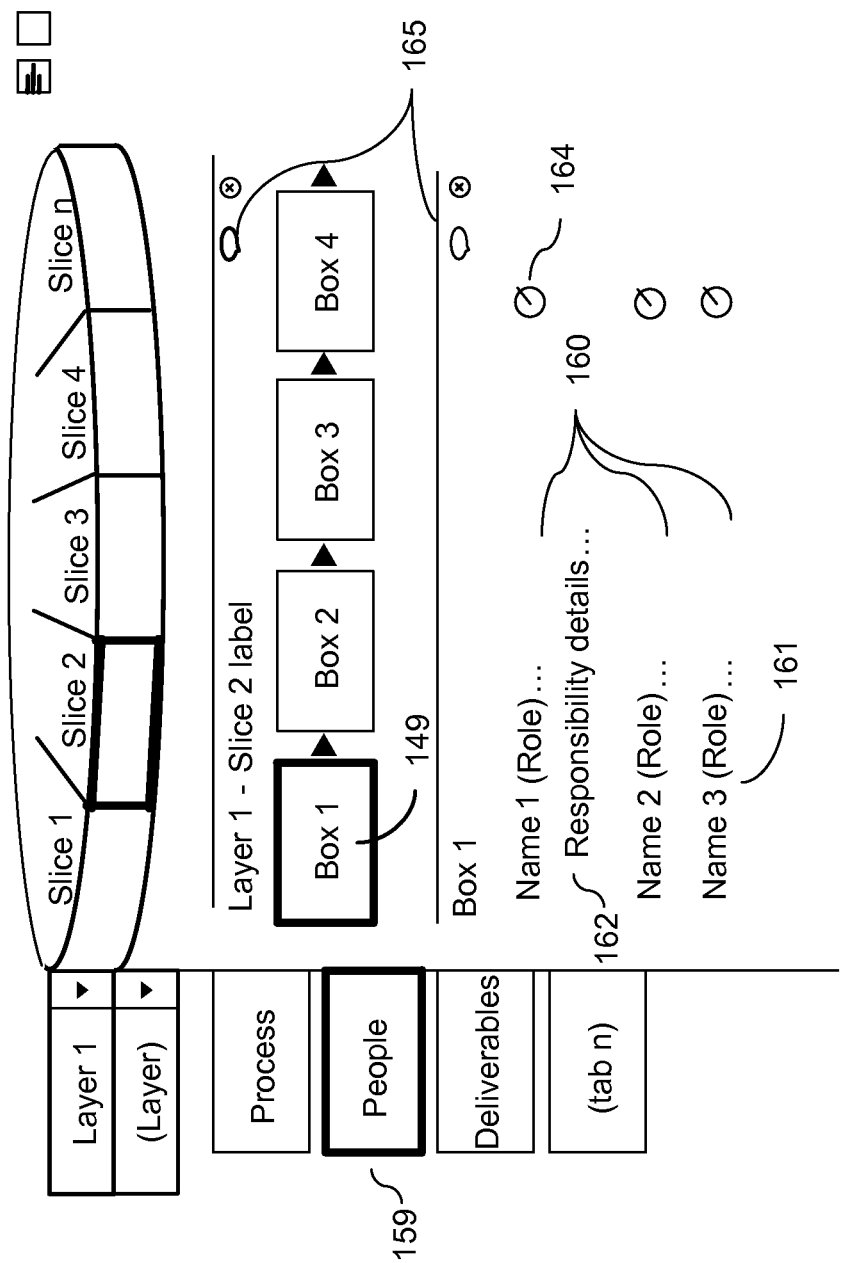
FIG. 13 is an illustration displaying a selected process box with the people tab selected, showing people roles.

The user switches views to the people view as shown in FIG. 13. To switch the view of a process box from process to people information, the user selects the "People" tab 159. The data under the box display area changes from action steps to people names and roles 160. There are one or multiple roles under a process box. The roles contain names of individuals 161 who are assigned to the roles. More information about the role responsibility is displayed by selecting the role label to expand for details 162. This responsibility data is context sensitive, for it relates to the selected process box 149. So, if another process box is selected and the same role is displayed, the role responsibility data is different since it relates to a new process box. Each role has a notes button 163 to the right side of the role. Public and private notes are be used by the user to contain extra information. Another context sensitive feature is provided with the objective buttons 164. Their data is based on people objective information rather than process context since the "People" tab is selected. A feature is how the user interface manages objective data context. If the objective button is to the right of the layer-slice line, then the data is based only on that layer-slice combination. Likewise, if the objective button is to the right of a box label, then the context is related only to that box.

Figure 14:
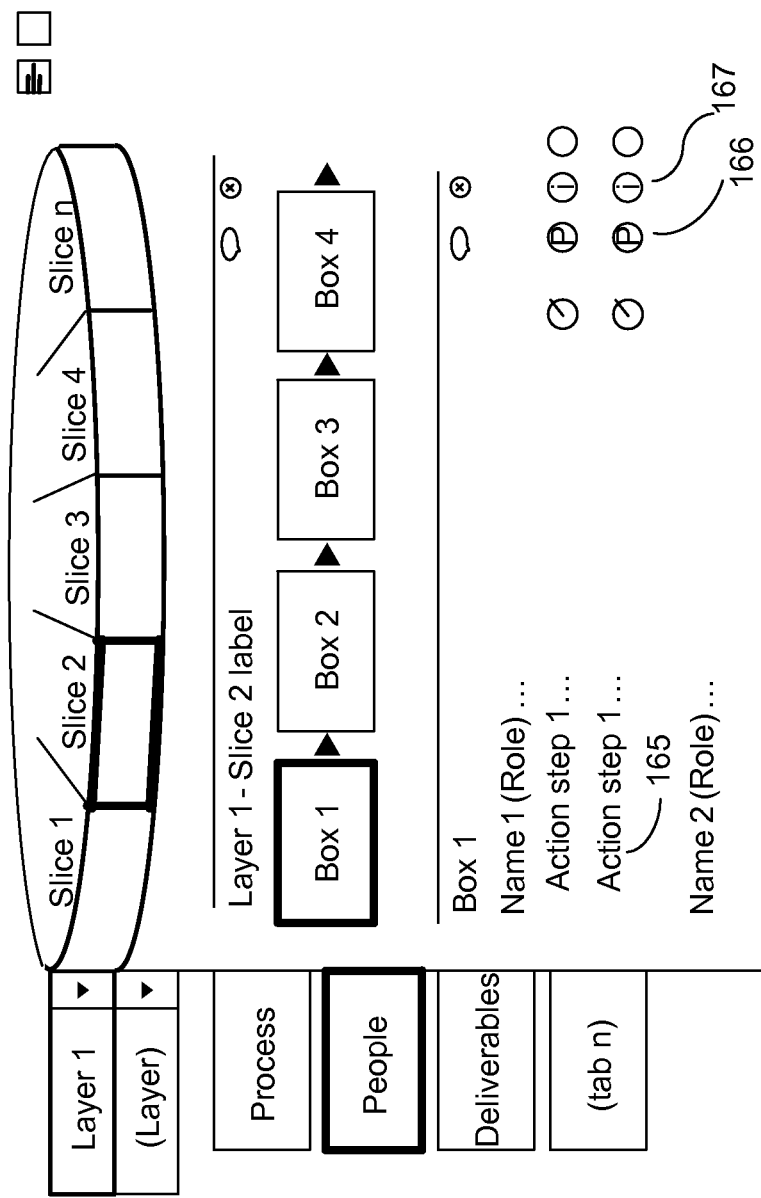
FIG. 14 is an illustration displaying a selected process box with the people tab selected, showing people roles embedded within the process actions steps.

In FIG. 14 the user interface also has an option for person name and role responsibility data to be related to actions steps. This provides the ability to display assigned action steps under the individual names. This figure shows the list of names with one name expanded to show its two assigned action steps 165. The action steps and sub-steps under the names also display their "P" status 166, "I" status 167 and other buttons like those at the step level in the Process tab.

Figure 15:
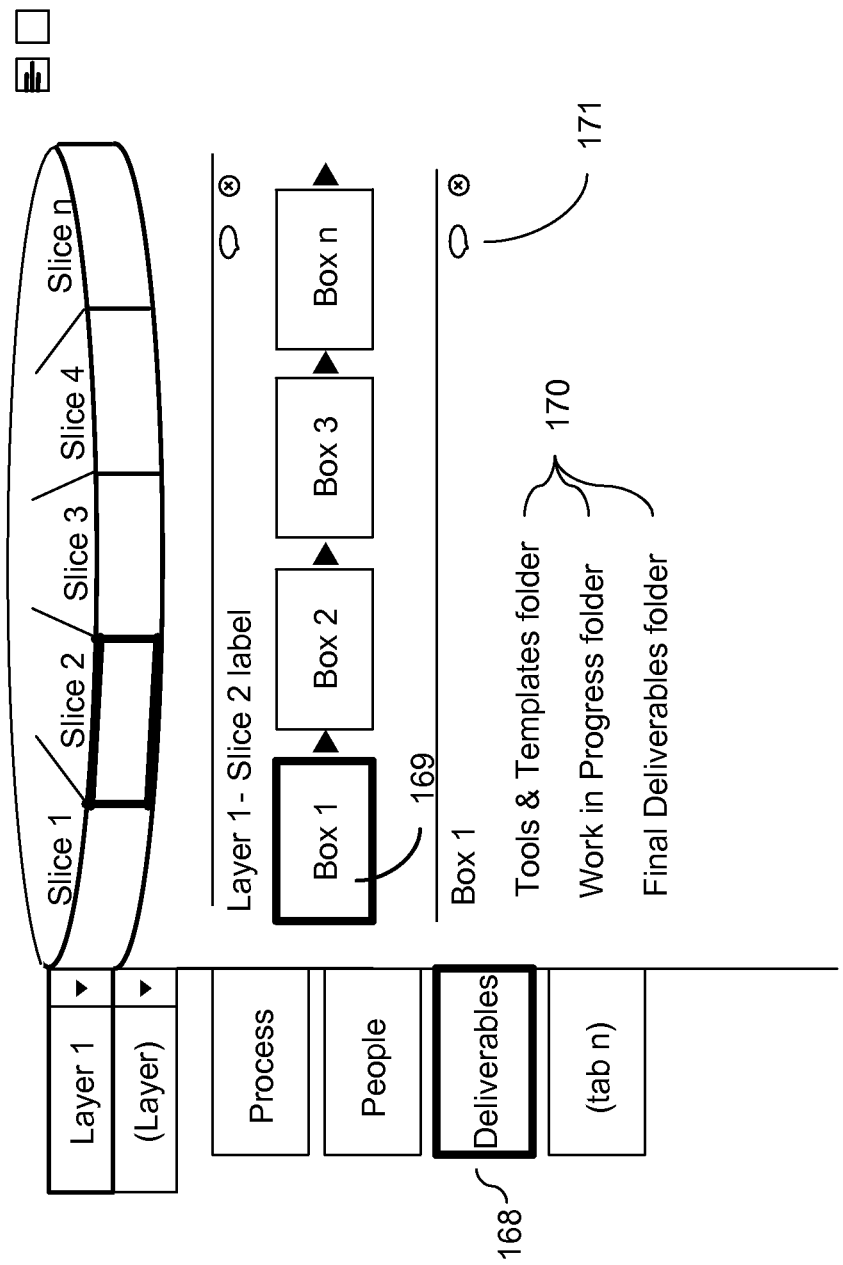
FIG. 15 is an illustration displaying a selected process box with the deliverables tab selected, showing deliverable folders.

Another view is the deliverables presentation within the user interface. FIG. 15 shows that when the "Deliverables" tab 168 is selected, the context of data related to layers, slices, and boxes change to the context regarding deliverable information. Selecting a process box 169 displays multiple folders (or directories) 170 for that selected box. Again, once a different side tab is selected, the objective buttons' contents are based on the context relative to the side tab, layers, slices, and process boxes. In this example, the objective button 171 to the right of the box label line displays objective content based on Deliverables for that process box.

Figure 16:
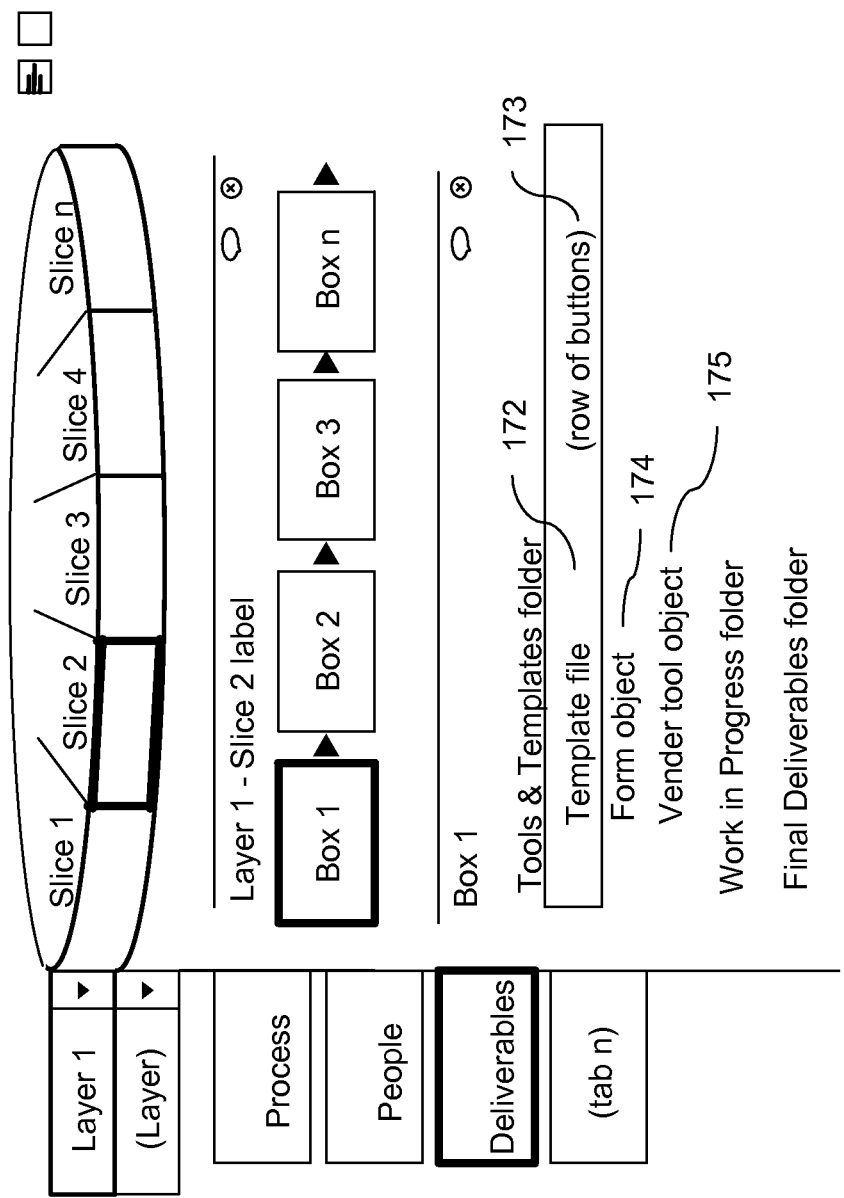
FIG. 16 is an illustration displaying a selected process box with the deliverables tab selected, showing deliverable folders along with folder objects.
Figure 17:
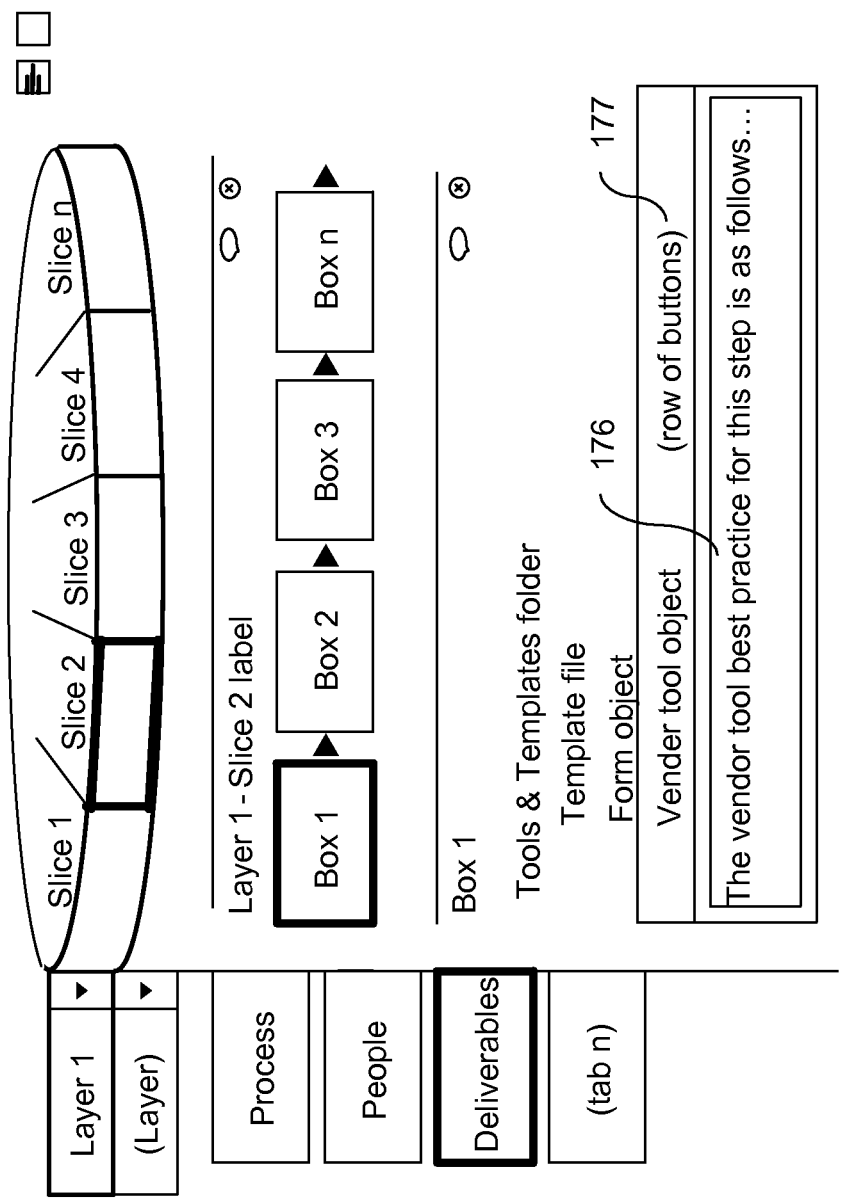
FIG. 17 is an illustration displaying a selected process box with the deliverables tab selected, showing deliverable folders along with a vendor tool object that is expanded to show a description box.

Each Deliverable tab folder, as displayed in FIG. 16, is expanded to display different objects. The template file object 172 under the "Template & Tools folder" is an example where the user contains a best practice file template. As the user moves the mouse over the file name, a highlight bar appears with a set of buttons 173 for extra features like file rename, duplicate, move a copy to another folder, history, delete, etc. This interface mouse-over button display feature works in the same way for all folders and folder objects. The "Form object" 174 item provides access to a form window that displays fields for capturing data, which is then stored in the system's database. The "Vendor tool object" 175 is where data is stored about a third-party vendor tool or vendor technology. FIG. 17 displays what the user interface shows when the vendor tool object is opened for best practice content information access 176. This object also has its own set of buttons 177 that include vendor tool description and export/import access features where the system produces events needed to export to or import from that vendor tool.

In summary, the matrix user interface along with the top-level pie/layer images provides a simple way to display and interact with different best practice or process methodology content. After the user loads different process layers, the matrix view of the content is displayed by selecting pie slices. The resulting process boxes are selected to present more detailed actions steps. The data in each process box is change from process data, to people roles data, and then to deliverables data all with a simple click of the side tabs. This provides third dimensional views of the best practice data Upon reading this disclosure, those of skill in the art will appreciate still additional alternative structural and functional designs for a system and a method for managing projects and, more generally, providing a user with information about resources and tasks used in a project. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A project management system having a user interface, the user interface comprising:
a first output view subsystem, operatively coupled to a database containing information related to a project, the first output view subsystem adapted to provide a perspective view of a three-dimensional depiction of a pie comprising a plurality of slices, a plurality of layers, and a plurality of cells, wherein each slice represents a stage of the project and each cell is formed by an intersection of a slice of the plurality of slices and a layer of the plurality of layers; the perspective view further comprising a first layer view representative of a first subset of the information related to the project and comprising a first set of cells associated with the first subset of information, the first subset of information corresponding to a first tab of the user interface;

a second output view subsystem, operatively coupled to the database, the second output view subsystem adapted to provide a second layer view representative of a second subset of the information related to the project and comprising a second set of cells associated with the second subset of information, the second subset of information corresponding to a second tab of the user interface; and a third output view subsystem, operatively coupled to the database, the third output view subsystem adapted to provide a third layer view representative of a third subset of the information related to the project and comprising a third set of cells associated with the third subset of information, the third subset of information corresponding to a third tab of the user interface.

2. The system of claim 1, wherein at least one of the first output view subsystem, the second output view subsystem, and the third output view subsystem is further adapted to represent at least one of: best practices, process methodology, implementation processes, deliverable files, personnel, roles, responsibilities, scheduling, and milestones related to the project.

3. A method of providing a user interface for management of a project, comprising:

providing a perspective view of a three-dimensional depiction of a pie comprising a plurality of slices, a plurality of layers, and a plurality of cells, wherein each slice represents a stage of the project and each cell is formed by an intersection of a slice of the plurality of slices and a layer of the plurality of layers; the perspective view further comprising a first layer view representing a first subset of information relating to the project and comprising a first set of cells associated with the first subset of information, the first subset of information corresponding to a first tab of the user interface;

providing a second layer view representing a second subset of information relating to the project and comprising a second set of cells associated with the second subset of information, the second subset of information corresponding to a second tab of the user interface; and providing a third layer view representative of a third subset of the information related to the project and comprising a third set of cells associated with the third subset of information, the third subset of information corresponding to a third tab of the user interface.

4. The method of claim 3, wherein at least one of the first layer view, second layer view, and the third layer view represents at least one of: best practices, process methodology, implementation processes, deliverable files, personnel, roles, responsibilities, scheduling, and milestones related to the project.

5. The method of claim 3, wherein each tab corresponding to each subset of information is associated with at least one of: processes, roles, responsibilities, personnel, deliverables, project scheduling, and milestones.

6. The method of claim 3, wherein providing the first layer view and the second layer view includes providing a drop-down list for user selection of layers.

7. The method of claim 3, wherein the first subset of information comprises a process view further comprising a plurality of action steps, each action step in the process view corresponds to a selected slice and a selected layer.

8. The method of claim 7, wherein the action steps include at least one of: progress bars indicating portion of process completion, color coding indicating status, start dates, and end dates.

9. The method of claim 7, further comprising providing, in response to selection of one of the action steps, at least one of: control of whether one of the action steps are public or private, status selection control for one of the action steps, action step integration control, and automation control for one of the action steps.

10. A non-transitory, tangible computer readable storage medium storing a computer program executable by a processor for providing a user interface for management of a project, the actions of the computer program comprising:

providing a perspective view of a three-dimensional depiction of a pie comprising a plurality of slices, a plurality of layers, and a plurality of cells, wherein each slice represents a stage of the project and each cell is formed by an intersection of a slice of the plurality of slices and a layer of the plurality of layers; the perspective view further comprising a first layer view representing a first subset of information relating to the project and comprising a first set of cells associated with the first subset of information, the first subset of information corresponding to a first tab of the user interface;

providing a second layer view representing a second subset of information relating to the project and comprising a second set of cells associated with the second subset of information, the second subset of information corresponding to a second tab of the user interface; and providing a third layer view representative of a third subset of the information related to the project and comprising a third set of cells associated with the third subset of information, the third subset of information corresponding to a third tab of the user interface.

11. The computer readable storage medium of claim 10, wherein at least one of the first layer view, the second layer view, and the third layer view represents at least one of: best practices, process methodology, implementation processes, deliverable files, personnel, roles, responsibilities, scheduling, and milestones related to the project.

12. The computer readable storage medium of claim 10, wherein each tab corresponding to each subset of information is associated with at least one of: processes, roles, responsibilities, personnel, deliverable files, project scheduling, and milestones.

13. The computer readable storage medium of claim 10, wherein providing the first layer view and the second layer view includes providing a drop-down list for user selection of layers.

14. The computer readable storage medium of claim 10, wherein the first subset of information comprises a process view further comprising a plurality of action steps, each action step in the process view corresponds to a selected slice and a selected layer.

15. The computer readable storage medium of claim 14, wherein the action steps include at least one of: progress bars indicating portion of process completion, color coding indicating process status, process start dates, and process end dates.

16. The computer readable storage medium of claim 14, the actions of the computer program further comprising providing, in response to selection of one of the action steps, at least one of: control of whether one of the action steps are public or private, status selection control for one of the action steps, action step integration control, and automation control for one of the action steps.

\* \* \* \* \*